UNITED STATES PATENT OFFICE.

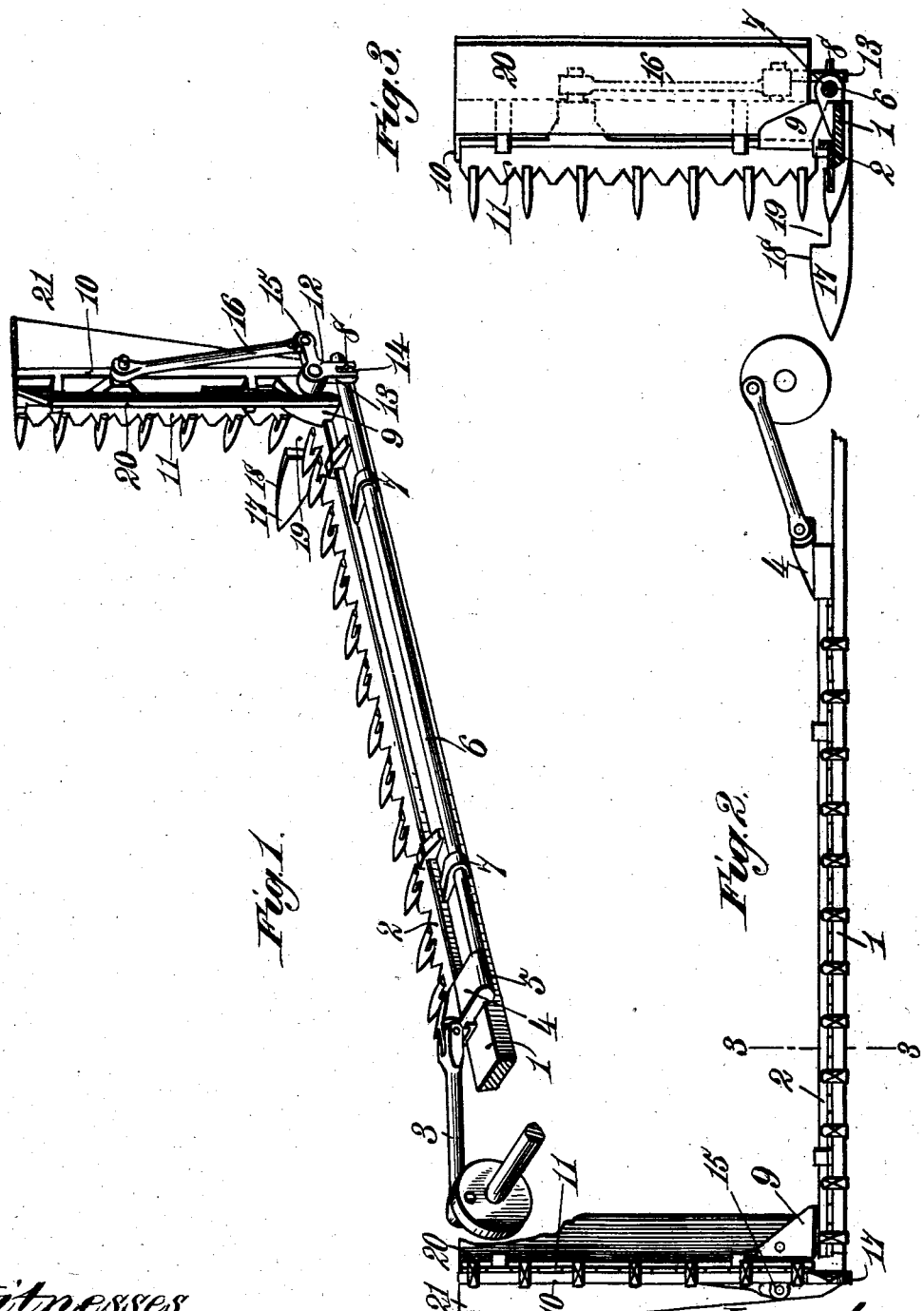

JOHN P. MONROE, OF HOPKINSVILLE, KENTUCKY, ASSIGNOR OF ONE-HALF TO BUCKNER LEAVELL, OF HOPKINSVILLE, KENTUCKY.

ATTACHMENT FOR MOWING-MACHINES.

SPECIFICATION forming part of Letters Patent No. 721,064, dated February 17, 1903.

Application filed February 4, 1902. Serial No. 92,538. (No model.)

*To all whom it may concern:*

Be it known that I, JOHN P. MONROE, a citizen of the United States, residing at Hopkinsville, in the county of Christian and State of Kentucky, have invented new and useful Improvements in Attachments for Mowers, of which the following is a specification.

My invention relates to certain new and useful improvements in attachments for mowing-machines whereby I am enabled to provide a machine capable of cutting long material or hay, and particularly pea-vines.

The objects of my invention are to provide novel mechanism for reciprocating the upright cutter-bar, to provide a novel construction of shoe for raising the pea-vines from the ground and causing them to be delivered to the cutter-bars in such manner as to facilitate the cutting of the vines, and to provide certain novel means for separating the cut from the uncut vines.

Other objects of the invention relate to details of construction and to combinations and arrangements of parts, all as hereinafter described, and particularly pointed out in the claims.

In order that my invention may be fully understood, I have illustrated the same in the accompanying drawings, wherein—
Figure 1 is a perspective view of my improved mower-machine. Fig. 2 is a front elevation, and Fig. 3 is a section taken on the line 3 3 of Fig. 2.

Referring now to the drawings, 1 indicates the finger-bar, 2 the cutter-bar, and 3 the pitman for reciprocating the cutter-bar, these parts being all as usually constructed and forming part of an ordinary mowing-machine.

4 indicates the cutter-bar head, to which the pitman 3 is connected and which is secured to the inner end of the cutter-bar. In the present instance this head is extended to project slightly beyond the rear side of the finger-bar 1, as indicated at 5. To this projecting portion of the head 4 is secured the inner end of a relatively long rod 6, which is supported in guides 7 on the rear side of the finger-bar, in which guides it is free to be reciprocated back and forth. The bar 6 extends nearly the full length of the finger-bar and at its outer end is provided with a pin 8. At the outer end of the finger-bar is provided a lug 9, to which and to the outer end of the finger-bar 1 is secured an upright finger-bar 10, coöperating with which is a cutter-bar 11. Pivotally mounted on the lug 9 is a bell-crank lever 12, one arm 13 of which is bifurcated or slotted, as indicated at 14, to receive the pin 8, while the other arm 15 is pivotally connected to the lower end of a pitman 16, which at its upper end is pivotally connected to the rear side of the cutter-bar 11.

Without further description it will be apparent that the rod 6 and cutter-bar 2 will be moved back and forth simultaneously by the pitman 3, and the engagement of the rod 6 with the bell-crank lever 12 will cause the cutter-bar 11 to be reciprocated up and down. The arrangement is such that as the cutter-bar 2 moves outward the cutter-bar 11 will move upward, and as the cutter-bar 2 moves inward the cutter-bar 11 will move downward.

Secured to the outer end of the finger-bar 1 and projecting forward therefrom in line with the finger-bar 10 is a shoe 17, having a slanting upper side 18, terminating a short distance in front of the teeth of the cutter-bar 11 in a recess 19, which extends beneath the cutter-bar 11 and across the line of travel of the cutter-bar 2. The provision of this recess is an important feature of the invention, as it prevents the hay or vines lifted from the ground by the shoe 17 from packing or crowding upon the upright cutter-bar faster than it can be cut. This is due to the fact that as the vines are lifted from the ground they pass up the incline 18, and on reaching the recess 19 they will tend to fall slightly, and thus be separated from each other, so that they can be more readily cut. The cutter-bar 2 passes across the plane of the shoe at the recessed portion 19, and consequently across the plane of movement of the upright cutter-bar, which latter also passes across the plane of movement of the cutter-bar 2, thereby insuring that all the hay or vines lifted by the shoe will come in contact with the knives of one or the other of the cutter-bars.

In order to the better separation of the cut from the uncut vines, I secure to the upright finger-bar 10 two wings 20 21, extending rearward at opposite sides thereof at angles of about forty-five degrees, the outer wing 21 being about half as wide as the inner wing and operating to press the uncut vines backward or to the side, while the inner wing operates to press the cut vines to one side and away from the vines still standing.

Having thus fully described my invention, what I claim as new is—

1. In a mower attachment in combination with the horizontal finger-bar, a cutter-bar cooperating therewith, a head secured to the inner end of said cutter-bar, means for reciprocating said head, a rod secured to said head, and mounted to slide in guides on the finger-bar at the rear thereof, an upright cutter-bar mounted on the outer end of said finger-bar, a bell-crank lever also mounted on the outer end of said finger-bar and located at the rear of said upright cutter-bar, a pin carried by the said rod and engaging in a slot formed in one arm of said lever, and a pitman pivotally connecting the other of said arms with said upright cutter-bar.

2. In a device of the class described, a cutter-bar mounted to move in a horizontal path, a cutter-bar mounted to move in a vertical path at the end of said first-named cutter-bar, and means for reciprocating said cutter-bars to cause each in turn to pass across the line of movement of the other.

3. In a device of the character described, in combination with the horizontal and upright cutter-bars, a shoe 17 located at the intersection of said bars and having a recess 19 in its upper side extending outward beyond the teeth of said cutter-bars.

4. In a device of the class described, in combination with the horizontal and upright cutter-bars and means for reciprocating the same, a shoe 17 located at the intersection of said bars and having a recess 19 in its upper side in line with the horizontal cutter-bar and extending outward beyond the teeth of both of said cutter-bars, said horizontal cutter-bar being adapted, in operation, to pass across the shoe within said recess.

In testimony whereof I have hereunto set my hand in presence of two subscribing witnesses.

JOHN P. MONROE.

Witnesses:
J. E. McKEE,
R. M. FAIRLEIGH.